(12) United States Patent
Micchelli et al.

(10) Patent No.: US 6,671,414 B1
(45) Date of Patent: Dec. 30, 2003

(54) SHIFT AND/OR MERGE OF TRANSFORMED DATA ALONG ONE AXIS

(75) Inventors: Charles A. Micchelli, Mohegan Lake, NY (US); Marco Martens, Chappaqua, NY (US); Timothy J. Trenary, Fort Collins, CO (US); Joan L. Mitchell, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/524,266

(22) Filed: Mar. 13, 2000

(51) Int. Cl.⁷ .............................. G06K 9/36; G06K 9/32
(52) U.S. Cl. ...................... 382/250; 382/277; 382/248; 382/280; 382/244; 382/294; 382/300
(58) Field of Search ................................ 382/232, 233, 382/244, 276, 282, 294, 300, 305, 248, 250, 251, 240, 277, 280; 375/240.2, 240.26, 240.17, 240.18, 240.01; 348/395.1, 405.1, 441; 345/619, 628; 358/426.01, 426.16, 428, 453; 708/290, 400, 401, 402

(56) References Cited

U.S. PATENT DOCUMENTS

| | | | | |
|---|---|---|---|---|
| 4,894,713 A | * | 1/1990 | Delogne et al. | 375/240.2 |
| 5,455,874 A | * | 10/1995 | Ormsby et al. | 382/251 |
| 6,115,070 A | * | 9/2000 | Song et al. | 375/240.12 |
| 6,256,422 B1 | * | 7/2001 | Mitchell et al. | 382/248 |
| 6,393,155 B1 | * | 5/2002 | Bright et al. | 382/248 |
| 6,473,533 B1 | * | 10/2002 | Yokose et al. | 382/248 |

FOREIGN PATENT DOCUMENTS

CN   310862   11/1997

OTHER PUBLICATIONS

Ut–Va Koc, et al., "Interpolation–Free Subpixel Motion Estimation Techniques in DCT Domain", IEEE Transactions on Circuits and Systems for Video Technology, vol. 8, No. 4, Aug. 1998.

Ut–Va Koc, et al., "DCT–Based Motion Estimation", IEEE Transactions on Image Processing, vol. 7, No. 7, Jul. 1998.

Shih–Fu Chang, et al., "Manipulation and Compositing of MC–DCT Compressed Video", IEEE Journal on Selected Areas in communications, vol. 13, No. 1, Jan. 1995.

Weidong Kou et al., "A Direct Computation of DCT Coefficients for a Signal Block Taken from Two Adjacent Blocks", IEEE Transactions on Signal Processing, vol. 29, No. 7, Jul. 1991.

Soo–Chang Pei et al., "High Resolution Wigner Distribution Using Chirp Z–Transform Analysis", IEEE Transactions on Signal Processing, vol. 29, No. 7, Jul. 1991.

* cited by examiner

Primary Examiner—Andrew W. Johns
Assistant Examiner—Amir Alavi
(74) Attorney, Agent, or Firm—Whitham, Curtis & Christofferson, P.C.; Stephen C. Kaufman

(57) ABSTRACT

A method of transform domain processing of transformed data is applied to image processing in various applications. A one-dimensional algorithm allows for the selection of an arbitrary contiguous eight component DCT sub-block from two adjacent DCT blocks that foregoes the expense of image manipulation in the real domain. Due to the fact that non-zero DCT coefficients are generally sparse, this algorithm lends itself nicely to the development of special cases which are faster than methods in use today. The de-quantization and re-quantization can be combined at execution time with the constants.

23 Claims, 11 Drawing Sheets

$$a_{ij} = Q_j(\text{FROM G})a'_{ij}$$
$$b_{ij} = Q_j(\text{FROM H})b'_{ij}$$

$$a_{ij} = a'_{ij} / Q_i(\text{OUTPUT})$$
$$b_{ij} = b'_{ij} / Q_i(\text{OUTPUT})$$

SHIFT AND/OR MERGE OF TRANSFORMED DATA ALONG ONE AXIS

CROSS REFERENCE TO RELATED APPLICATIONS

The present application is related to the following U.S. patent application Ser. No. 09/186,245 filed Nov. 4, 1998, by Joan L. Mitchell and Martin J. Bright, for "Transform-Domain Correction of Real-Domain Errors", Ser. No. 09/186,249 filed Nov. 4, 1998, by Martin J. Bright and Joan L. Mitchell, for "Error Reduction in Transformed Digital Data", and Ser. No. 09/186,247 filed Nov. 4, 1998, by Martin J. Bright and Joan L. Mitchell, for "Reduced-error Processing of Transformed Digital Data", all assigned to a common assignee with this application and the disclosures of which are incorporated herein by reference.

BACKGROUND OF THE INVENTION

1. Field of the Invention

This invention relates to transform coding of digital data, specifically to transform domain processing of transformed data and, more particularly, to a shift and/or merge of transformed data which increases the speed of, for example, processing of color images printed by color printers.

2. Background Description

Transform coding is the name given to a wide family of techniques for data coding, in which each block of data to be coded is transformed by some mathematical function prior to further processing. A block of data may be a part of a data object being coded, or may be the entire object. The data generally represent some phenomenon, which may be for example a spectral or spectrum analysis, an image, an audio clip, a video clip, etc. The transform function is usually chosen to reflect some quality of the phenomenon being coded; for example, in coding of audio, still images and motion pictures, the Fourier transform or Discrete Cosine Transform (DCT) can be used to analyze the data into frequency terms or coefficients. Given the phenomenon being compressed, there is generally a concentration of the information into a few frequency coefficients. Therefore, the transformed data can often be more economically encoded or compressed than the original data. This means that transform coding can be used to compress certain types of data to minimize storage space or transmission time over a communication link.

An example of transform coding in use is found in the Joint Photographic Experts Group (JPEG) international standard for still image compression, as defined by *ITU-T Rec. T.81* (1992) | *ISO/IEC 10918-1:1994, Information technology—Digital compression and coding of continuous-tone still images, Part 1: Requirements and Guidelines*. Another example is the Moving Pictures Experts Group (MPEG) international standard for motion picture compression, defined by *ISO/IEC 11172:1993, Information Technology—Coding of moving pictures and associated audio for digital storage media at up to about 1.5 Mbits/s*. This MPEG-1 standard defines systems for both video compression (Part 2 of the standard) and audio compression (Part 3). A more recent MPEG video standard (MPEG-2) is defined by *ITU-T Rec. H.262* | *ISO/IEC 13818-2: 1996 Information Technology—Generic Coding of moving pictures and associated audio—Part 2: video*. A newer audio standard is *ISO/IEC 13818-3: 1996 Information Technology—Generic Coding of moving pictures and associated audio—Part 3: audio*. All three image international data compression standards use the DCT on 8×8 blocks of samples to achieve image compression. DCT compression of images is used herein to give illustrations of the general concepts put forward below; a complete explanation can be found in Chapter 4 "The Discrete Cosine Transform (DCT)" in W. B. Pennebaker and J. L. Mitchell, *JPEG: Still Image Data Compression Standard*, Van Nostrand Reinhold: New York, (1993).

Wavelet coding is another form of transform coding. Special localized basis functions allow wavelet coding to preserve edges and small details. For compression the transformed data is usually quantized. Wavelet coding is used for fingerprint identification by the Federal Bureau of Investigation (FBI). Wavelet coding is a subset of the more general subband coding technique. Subband coding uses filter banks to decompose the data into particular bands. Compression is achieved by quantizing the lower frequency bands more finely than the higher frequency bands while sampling the lower frequency bands more coarsely than the higher frequency bands. A summary of wavelet, DCT, and other transform coding is given in Chapter 5 "Compression Algorithms for Diffuse Data" in Roy Hoffman, *Data Compression in Digital Systems*, Chapman and Hall: New York, (1997).

In any technology and for any phenomenon represented by digital data, the data before a transformation is performed are referred to as being "in the real domain". After a transformation is performed, the new data are often called "transform data" or "transform coefficients", and referred to as being "in the transform domain". The function used to take data from the real domain to the transform domain is called the "forward transform". The mathematical inverse of the forward transform, which takes data from the transform domain to the real domain, is called the respective "inverse transform".

In general, the forward transform will produce real-valued data, not necessarily integers. To achieve data compression, the transform coefficients are converted to integers by the process of quantization. Suppose that ($\lambda_i$) is a set of real-valued transform coefficients resulting from the forward transform of one unit of data. Note that one unit of data may be a one-dimensional or two-dimensional block of data samples or even the entire data. The "quantization values" ($q_i$) are parameters to the encoding process. The "quantized transform coefficients" or "transform-coded data" are the sequence of values ($a_i$) defined by the quantization function Q:

$$a_i = Q(\lambda_i) = \left\lfloor \frac{\lambda_i}{q_i} + 0.5 \right\rfloor, \quad (1)$$

where $\lfloor x \rfloor$ means the greatest integer less than or equal to x.

The resulting integers are then passed on for possible further encoding or compression before being stored or transmitted. To decode the data, the quantized coefficients are multiplied by the quantization values to give new "dequantized coefficients" ($\lambda_i'$) given by $$\lambda_i' = q_i a_i \quad (2)$$

The process of quantization followed by de-quantization (also called inverse quantization) can thus be described as "rounding to the nearest multiple of $q_i$". The quantization values are chosen so that the loss of information in the quantization step is within some specified bound. For example, for audio or image data, one quantization level is usually the smallest change in data that can be perceived. It is quantization that allows transform coding to achieve good data compression ratios. A good choice of transform allows quantization values to be chosen which will significantly cut down the amount of data to be encoded. For example, the DCT is chosen for image compression because the frequency components which result produce almost independent responses from the human visual system. This means that the coefficients relating to those components to which the visual system is less, sensitive, namely the high-frequency components, may be quantized using large quantization values without loss of image quality. Coefficients relating to components to which the visual system is more sensitive, namely the low-frequency components, are quantized using smaller quantization values.

The inverse transform also generally produces non-integer data. Usually the decoded data are required to be in integer form. For example, systems for the playback of audio data or the display of image data generally accept input in the form of integers. For this reason, a transform decoder generally includes a step that converts the non-integer data from the inverse transform to integer data, either by truncation or by rounding to the nearest integer. There is also often a limit on the range of the integer data output from the decoding process in order that the data may be stored in a given number of bits. For this reason the decoder also often includes a "clipping" stage that ensures that the output data are in an acceptable range. If the acceptable range is [a, b], then all values less than a are changed to a, and all values greater than b are changed to b.

These rounding and clipping processes are often considered an integral part of the decoder, and it is these which are the cause of inaccuracies in decoded data and in particular when decoded data are re-encoded. For example, the JPEG standard (Part 1) specifies that a source image sample is defined as an integer with precision P bits, with any value in the range 0 to $2^{P-1}$. The decoder is expected to reconstruct the output from the inverse discrete cosine transform (IDCT) to the specified precision. For the baseline JPEG coding P is defined to be 8; for other JPEG DCT-based coding, P can be 8 or 12. The MPEG-2 video standard states in Annex A (Discrete Cosine Transform), "The input to the forward transform and the output from the inverse transform is represented with 9 bits."

For JPEG the compliance test data for the encoder source image test data and the decoder reference test data are 8 bit/sample integers. Even though rounding to integers is typical, some programming languages convert from floating point to integers by truncation. Implementations in software that accept this conversion to integers by truncation introduce larger errors into the real-domain integer output from the inverse transform.

The term "high-precision" is used herein to refer to numerical values which are stored to a precision more accurate than the precision used when storing the values as integers. Examples of high-precision numbers are floating-point or fixed-point representations of numbers.

In performing a printing operation, there is a need for the printer to be able to extract an arbitrary 8×8 pixel contiguous block from two adjacent 8×8 pixel blocks. The traditional approach involves conversion from the Discrete Cosine Transform (DCT) domain for each of the original blocks to the respective real domains (each a 64-pixel sample space) via an inverse DCT followed by "shifting" an 8×8 window about the shared image border in the real domain and finally transforming this new image back to the DCT domain. This method is computationally complex and diminishes the speed at which preprocessing of images takes place, thereby reducing overall printer speed.

While it is commonplace for graphics utilities to merge two independent images with brute force pixel-by-pixel merges as described above, it is also possible to approach the problem by working exclusively in the frequency domain. This approach potentially has at least two advantages over the traditional method in that it (1) provides for faster and more flexible image processing for the printing industry than is available with current technologies and (2) eliminates errors which routinely take place when working in the real domain with fixed precision computation by avoiding the real domain entirely.

Ut-Va Koc and K. J. Ray Liu in "DCT-Based Motion Estimation", *IEEE Transactions on Image Processing*, Vol. 7, No. 7, July 1998, pp. 948–965, and Ut-Va Koc and K. J. Ray Liu in "Interpolation-Free Subpixel Motion Estimation Techniques in DCT Domain", *IEEE Transactions on Circuits and Systems for Video Technology*, Vol. 8., No. 4, August 1998, pp. 460–487, describe a method by which pixel motion can be approximated in subsequent image frames. The key mechanism in both articles is the construction of impulse functions derived from the inverse discrete cosine transform (IDCT) and inverse discrete sine transform (IDST) of pseudo phases which express a relationship between the discrete cosine transform (DCT) and discrete sine transform (DST) of temporarily shifted image samples. The key difference between the two articles is that the second article extends the first to enable detection of motion at the sub-pixel level. Neither article teaches including the de-quantization and/or re-quantization in the impulse solutions.

Shih-Fu Chang and David G. Messerschmitt in "Manipulation and Compositing of MC-DCT Compressed Video", *IEEE Journal on Selected Areas in Communications*, Vol. 13, No. 1, January 1995, pp. 1–11, describe compression algorithms using discrete cosine transform (DCT) with or without motion compensation (MC). Compression systems of this kind include JPEG (Joint Photographic Experts Group), motion JPEG, MPEG (Moving Picture Experts Group), and the H.261 standard. Chang and Messerschmitt derive a set of algorithms in which video signals are represented by quantized transform coefficients. Their paper uses the term "quantized DCT coefficients" to mean the de-quantized coefficients since they explain that these quantized DCT coefficients "can be obtained after the inverse quantizer in the decoder . . . " (p.2). Footnote 2 notes, " . . . we assume the transform coefficients are by default quantized, so we can take advantage of the fact that many coefficients are truncated to zero after quantization." The de-quantization and/or the re-quantization are not included in their transform domain equations and operations.

A comparison of the complexity of computation in Chang and Messerschmitt's method and that of the present invention may be illustratively made by comparing the performance at the one-dimensional block level. Consider the following sub-block acquisition from two 1×8 blocks G and H:

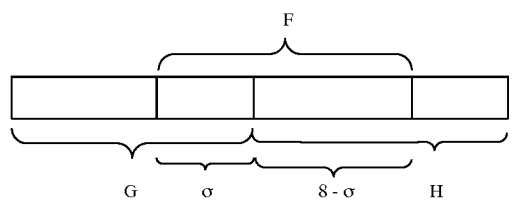

Appealing to the approach suggested by Chang and Messerschmitt, we first write $$F = M_1 G + M_2 H,$$

where $$M_1 = \begin{bmatrix} 0 & I_\sigma \\ 0 & 0 \end{bmatrix} \text{ and } M_2 = \begin{bmatrix} 0 & 0 \\ I_{8-\sigma} & 0 \end{bmatrix},$$

and apply the FDCT operator D to get $$DF = DM_1G + DM_2H = DM_1D^TDG + DM_2D^TDH = DCT(M_1) \cdot DCT(G) + DCT(M_2) \cdot DCT(H),$$

where we use the fact that $DD^T = I_8$ and $DAD^T$ is the two-dimensional DCT of the 8×8 matrix A. At a "worst case" level, the computation in Chang and Messerschmitt requires $$64 \times 2 = 128 \text{ multiplcations and}$$
$$56 \times 2 + 8 = 120 \text{ additions,}$$

(7 add/rows for each matrix result)    (to add the 2 results)

whereas the method according to the present invention requires 95 multiplications and 103 additions.

Weidong Kou and Tore Fjällbrant in "A Direct Computation of DCT Coefficients for a Signal Block Taken from Two Adjacent Blocks", *IEEE Transactions on Signal Processing*, Vol. 39, No. 7, July 1991, pp. 1692–1695, and Weidong Kou and Tore Fjällbrant in "Fast Computation of Transform Coefficients for a Subadjacent Block for a Transform Family", *IEEE Transactions on Signal Processing*, Vol. 39, No. 7, July 1991, pp. 1695–1699, present in the first article a method for direct computation of DCT coefficients of a one-dimensional signal block composed of halves of two adjacent signal blocks from the DCT coefficients of the two original blocks. The key mechanism in this approach is the use of matrix factorization/matrix algebra. The result is a method which (for a 1×8 signal block) requires 60 multiplications and 68 additions, whereas the worst case of the method according to the present invention applied to a shift over 4 requires 40 multiplications and 60 additions. multiplications and 60 additions.

The method of the present invention gives the best known results for the shift over 4 pixels. It also gives the best known results for merges with 4 pixels from each block. Moreover, it excels in that it is just as easy to derive the algorithm for arbitrary signal blocks formed from (a samples of one block and 8–σ a samples from the adjacent block as it is for "½ of one and ½ of the other". Compare this with the algorithm described in the words of the authors (paraphrased) yields complex derivations when attempting to extend to any case other than "½ and ½". Neither article teaches including the de-quantization in their equations nor the method to obtain the solutions taught in this invention.

SUMMARY OF THE INVENTION

It is therefore an object of the present invention to provide transform domain processing to shift and/or merge transformed data which increases the speed of processing of color images by color printers.

According to the invention, a computer implemented one-dimensional algorithm allows for the selection of an arbitrary contiguous eight component DCT sub-block from two adjacent DCT blocks that foregoes the expense of image manipulation in the real domain. Due to the fact that non-zero DCT coefficients are generally sparse, this algorithm lends itself nicely to the development of special cases which are faster than methods in use today. In particular, it will aid the development of truly high speed printing.

The algorithm according to the present invention meets the following criteria:

1) Providing for faster and more flexible image processing for the printing industry than is available with current technologies. As an example, consider that JPEG images are often padded on the right and bottom when the image of interest has pixel dimensions which are not multiples of eight. If this image is rotated by ninety degrees, the padded areas suddenly take on new precedence as the top or left side of the image. By quickly performing one-dimensional shifts of the image border in each of the two dimensions via the method of this invention, the boundaries of the image are redefined and quality is restored.

2) Eliminating errors which routinely take place when working in the real domain with integer precision computation by avoiding the real domain entirely. See, U.S. patent application Ser. Nos. 09/186,245, 09/186,249, and 09/186,247, cited above.

BRIEF DESCRIPTION OF THE DRAWINGS

The foregoing and other objects, aspects and advantages will be better understood from the following detailed description of a preferred embodiment of the invention with reference to the drawings, in which:

FIG. 11 is a function block from the flow diagram of FIGS. 10A and 10B showing another calculation of $a_{ij}$ and $b_{ij}$ incorporating only the de-quantization;

FIG. 12 is a function block from the flow diagram of FIGS. 10A and 10B showing another calculation of $a_{ij}'$ and $b_{ij}'$ incorporating only the re-quantization;

FIG. 13 is a function block from the flow diagram of FIGS. 10A and 10B showing $a_{ij}$ and $b_{ij}$ being set equal to $a_{ij}'$ and $b_{ij}'$ because no quantization is incorporated into the equations.

DETAILED DESCRIPTION OF A PREFERRED EMBODIMENT OF THE INVENTION

Figure 1:
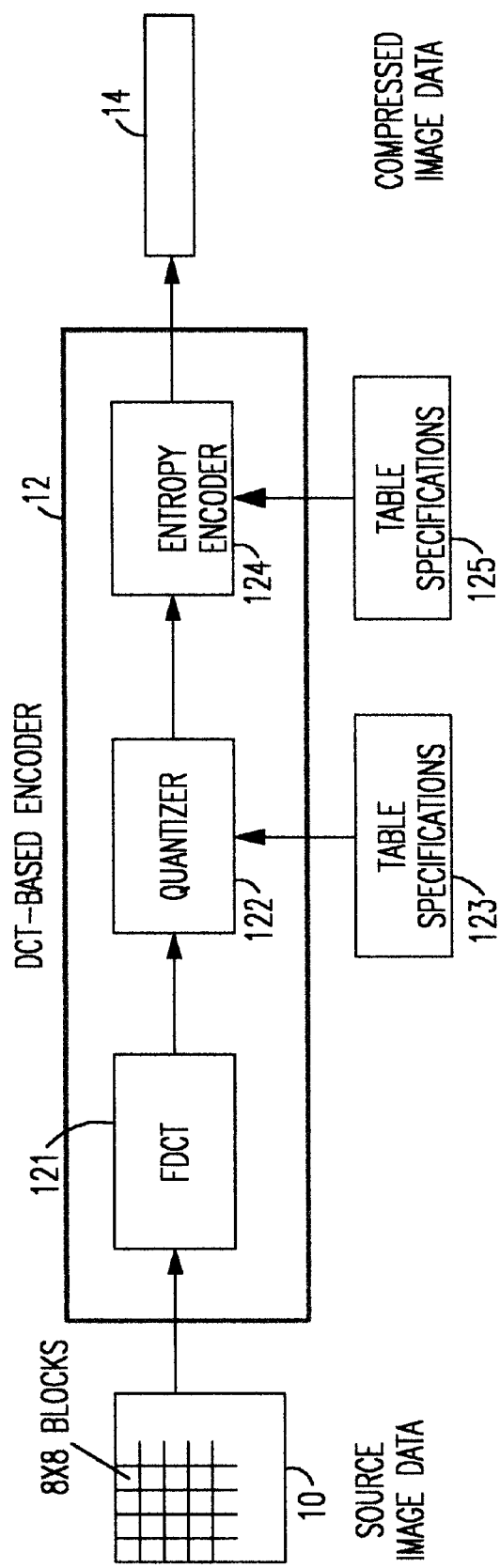
FIG. 1 is a simplified block diagram of a DCT-based JPEG encoder.

The purpose of image compression is to represent images with less data in order to save storage costs or transmission time and costs. The most effective compression is achieved by approximating the original image, rather than reproducing it exactly. The JPEG standard allows the interchange of images between diverse applications and opens up the capability to provide digital continuous-tone color images in multi-media applications. JPEG is primarily concerned with images that have two spatial dimensions, contain grayscale or color information, and possess no temporal dependence, as distinguished from the MPEG (Moving Pictures Experts Group) standard. The amount of data in a digital image can be extremely large, sometimes being millions of bytes. JPEG compression can reduce the storage requirements by more than an order of magnitude and improve system response time in the process. Although the preferred embodiment uses JPEG compressed data, it will be understood by those skilled in the art that the principles of the invention can be applied to MPEG compressed data or data compressed by other compression techniques, including audio data.

One of the basic building blocks for JPEG is the Discrete Cosine Transform (DCT). An important aspect of this transform is that it produces uncorrelated coefficients. Decorrelation of the coefficients is very important for compression because each coefficient can be treated independently without loss of compression efficiency. Another important aspect of the DCT is the ability to quantize the DCT coefficients using visually-weighted quantization values. Since the human visual system response is very dependent on spatial frequency, by decomposing an image into a set of waveforms, each with a particular spatial frequency, it is possible to separate the image structure the eye can see from the structure that is imperceptible. The DCT provides a good approximation to this decomposition.

The two basic components of an image compression system are the encoder and the decoder. The encoder compresses the "source" image (the original digital image) and provides a compressed data (or coded data) output. The compressed data may be either stored or transmitted, but at some point are fed to the decoder. The decoder recreates or "reconstructs" an image from the compressed data. In general, a data compression encoding system can be broken into three basic parts: an encoder model, an encoder statistical model, and an entropy encoder. The encoder model generates a sequence of "descriptors" that is an abstract representation of the image. The statistical model converts these descriptors into symbols and passes them on to the entropy encoder. The entropy encoder, in turn, compresses the symbols to form the compressed data. The encoder may require external tables; that is, tables specified externally when the encoder is invoked. Generally, there are two classes of tables; model tables that are needed in the procedures that generate the descriptors and entropy-coding tables that are needed by the JPEG entropy-coding procedures. JPEG uses two techniques for entropy encoding: Huffman coding and arithmetic coding. Similarly to the encoder, the decoder can be broken into basic parts that have an inverse function relative to the parts of the encoder.

JPEG compressed data contains two classes of segments: entropy-coded segments and marker segments. Other parameters that are needed by many applications are not part of the JPEG compressed data format. Such parameters may be needed as application-specific "wrappers" surrounding the JPEG data; e.g., image aspect ratio, pixel shape, orientation of image, etc. Within the JPEG compressed data, the entropy-coded segments contain the entropy-coded data, whereas the marker segments contain header information, tables, and other information required to interpret and decode the compressed image data. Marker segments always begin with a "marker", a unique 2-byte code that identifies the function of the segment. For more information the JPEG standard, see W. B. Pennebaker and J. L. Mitchell, *JPEG Still Image Data Compression Standard*, Van Nostrand Reinhold (1993).

Referring now to the drawings, and more particularly to FIG. 1, there is shown a simplified block diagram of a DCT-based encoder. A source image 10 sampled data in 8×8 blocks are input to the encoder 12. Each 8×8 block is transformed by the Forward Discrete Cosine Transform (FDCT) 121 into a set of 64 values, referred to as the DCT coefficients. One of these values is referred to as the DC coefficient, and the other 63 values are referred to as AC coefficients. Each of the 64 coefficients are then quantized by quantizer 122 using one of 64 corresponding values from a quantization table 123. The quantized coefficients are then passed to an entropy encoding procedure 124 using table specifications 125. This procedure compresses the data further. One of two entropy encoding procedures can be used, Huffman encoding or arithmetic encoding. If Huffman encoding is used, then Huffman table specifications must be provided, but if arithmetic encoding is used, then arithmetic coding conditioning table specifications must be provided. The previous quantized DC coefficient is used to predict the current DC coefficient and the difference is encoded. The 63 AC coefficients, however, are not differentially encoded but, rather, are converted into a zig-zag sequence. The output of the entropy encoder is the compressed image data 14.

Figure 2:
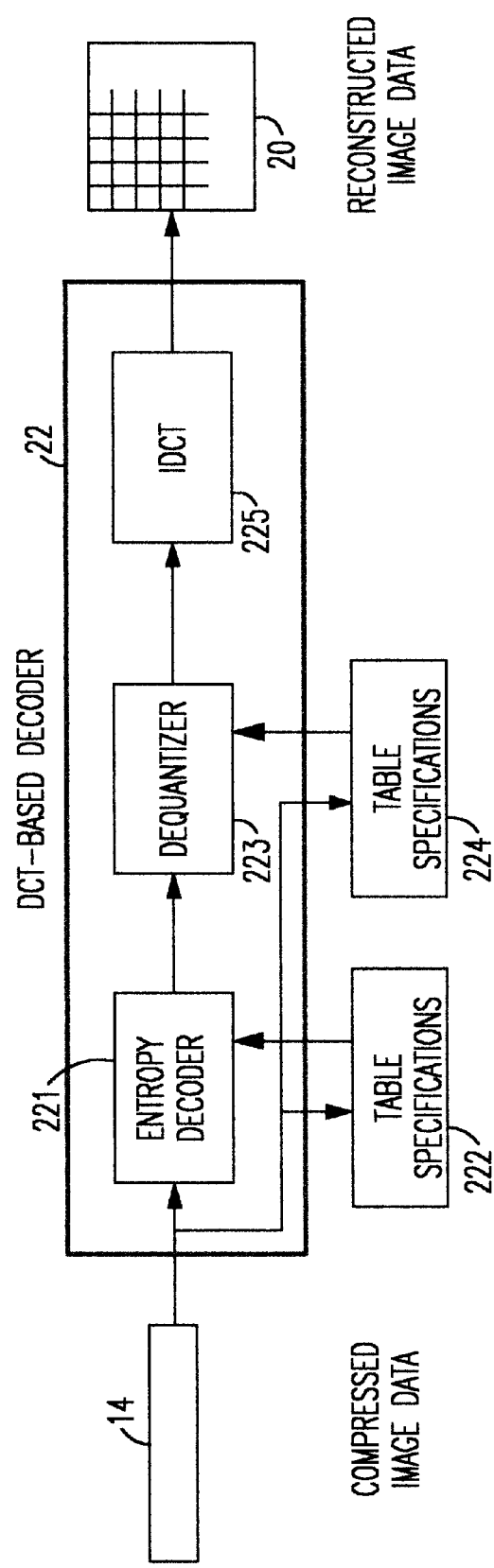
FIG. 2 is a simplified block diagram of a DCT-based JPEG decoder.

FIG. 2 shows a simplified block diagram of the DCT-based decoder. Each step shown performs essentially the inverse of its corresponding main procedure within the encoder shown in FIG. 1. The compressed image data 14 is input to the decoder 22 where it is first processed by an entropy decoder procedure 221 which decodes the zig-zag sequence of the quantized DCT coefficients. This is done using either Huffman table specifications or arithmetic coding conditioning table specifications 222, depending on the coding used in the encoder. The quantized DCT coefficients output from the entropy decoder are input to the dequantizer 223 which, using quantization table specifications 224, outputs dequantized DCT coefficients to Inverse Discrete Cosine Transform (IDCT) 225. The output of the IDCT 225 is the reconstructed image 20.

Figure 3:
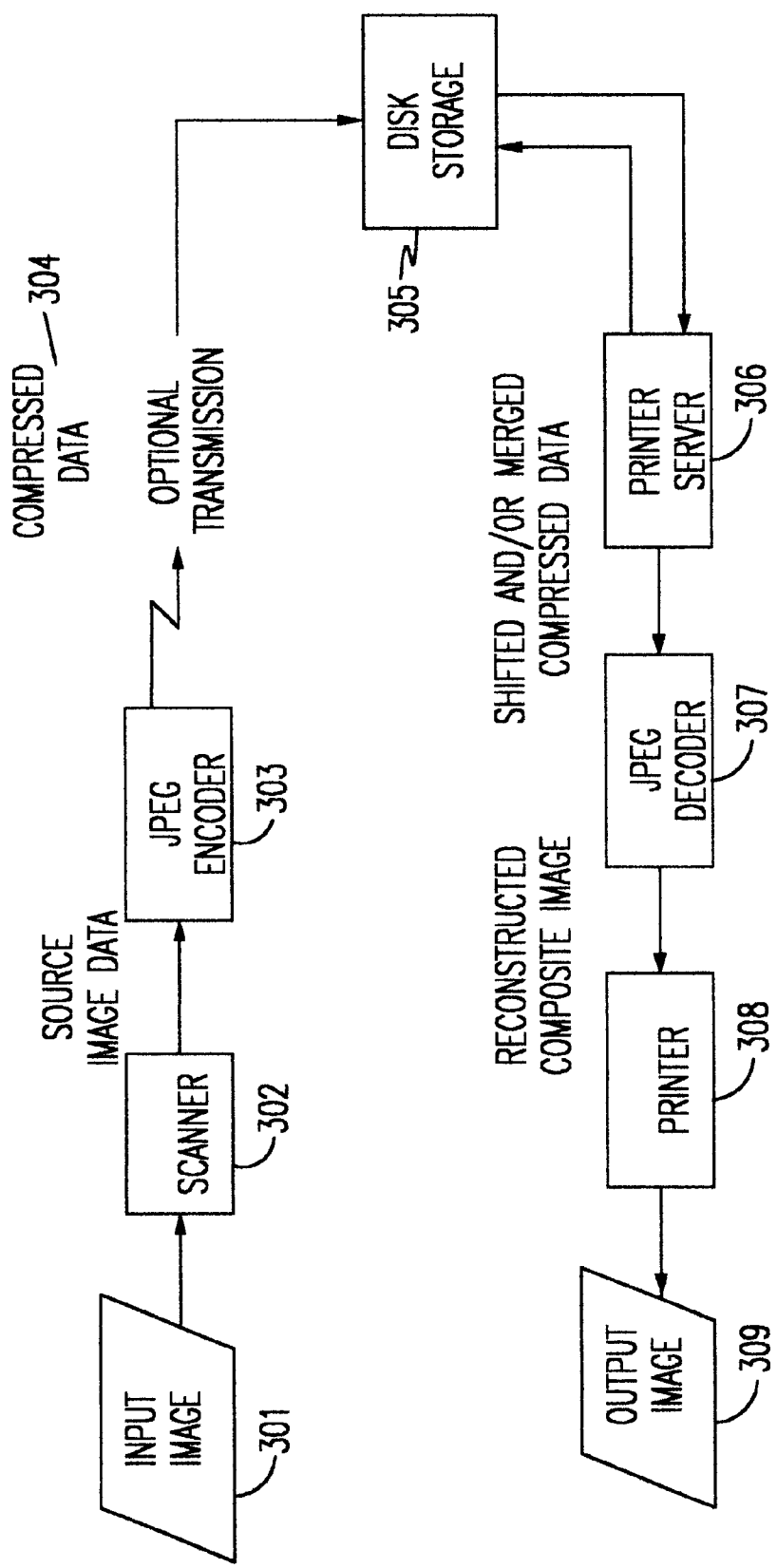
FIG. 3 is a block diagram of a simple printing system that uses JPEG compressed images.

FIG. 3 shows a block diagram of a simple printing system that uses JPEG compressed images. For this illustration, the input image is assumed to be a grayscale image and the printer, a grayscale printer. The input image 301 is scanned in the scanner 302 and then the source image data, a single component of gray, is compressed with a JPEG encoder 303, such as described with reference to FIG. 1. The JPEG encoder 303 is shown separate from the scanner 302, but in a practical embodiment, the JPEG encoder 303 could be incorporated with the scanner 302. The output of the JPEG encoder 303 is compressed data 304. After optional transmission, the compressed data is stored on a disk storage device 305. At some later time, the compressed data stored on the disk storage device 305 is retrieved by the printer server 306 which composes a composite image. The composite image is recompressed in the printer server 306 so that the JPEG decoder 307 decodes the composite image. The JPEG decoder 307 is as described with reference to FIG. 2. The printer 308 prints the grayscale composite image and produces the output image 309 on paper.

Figure 4:
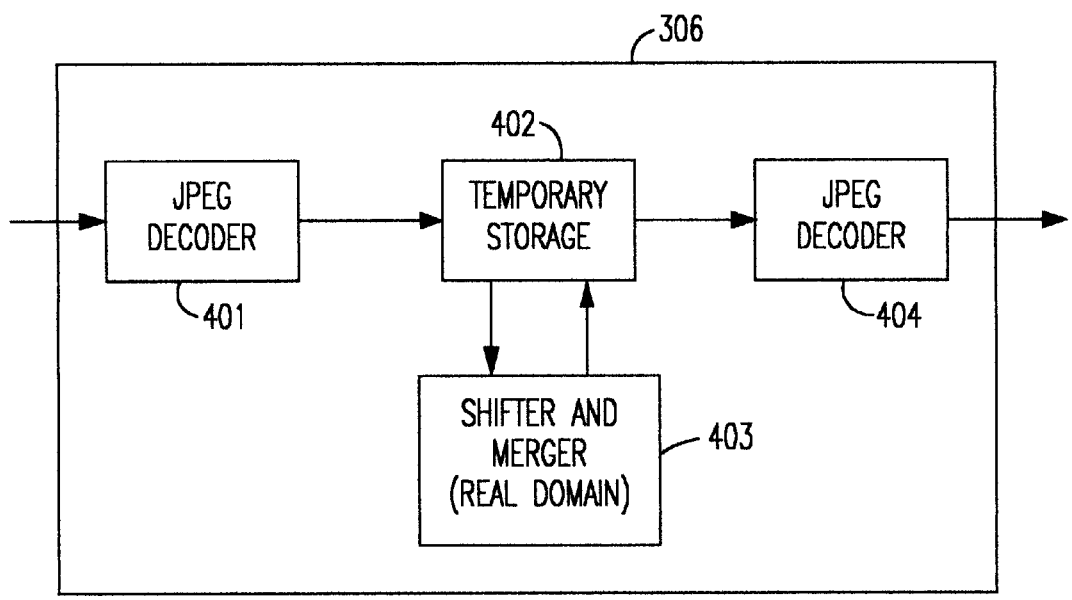
FIG. 4 is a block diagram showing in more detail a conventional printer server of the printing system of FIG. 3.

FIG. 4 shows in more detail a traditional printer server 306. The compressed images are JPEG decoded by JPEG decoder 401 and stored temporarily in temporary storage 402 as 8-bit/sample values. The composite image is created in the real domain by the shifter and merger 403 and stored in temporary storage 402. Then the composite image is encoded with the JPEG encoder 404. The JPEG decoder 401 and the JPEG encoder 404 are, again, like that shown in FIGS. 2 and 1, respectively. All of the blocks including the shifter and merger 403 in the real domain could be programs running in a processor, such as a RISC (Reduced Instruction Set Computer) processor, and example of which is the IBM PowerPC® processor. The point here is that the traditional printer server 306 performs the shift and merge operations in the real domain.

Figure 5:
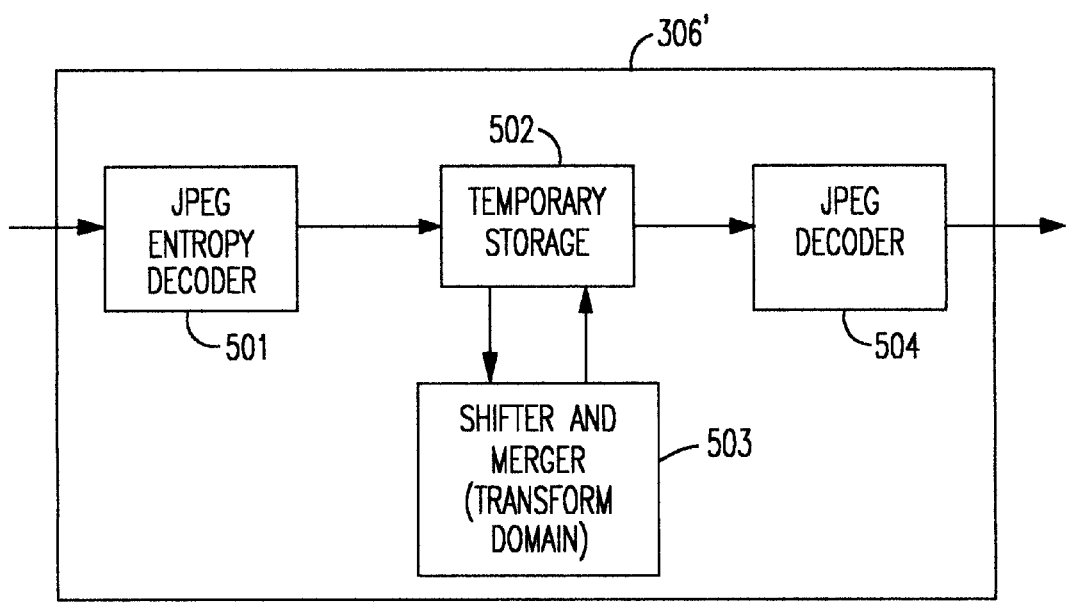
FIG. 5 is a block diagram showing an improved printer server realized by incorporating the principles of the present invention.

FIG. 5 shows the application of the present invention making a faster printer server 306'. The compressed images are JPEG entropy decoded in JPEG entropy decoder 501, and the quantized DCT coefficients are stored in temporary storage 502. The composite image is created by the shifter and merger 503 using transform domain processing, in contrast to real domain processing. Then the DCT coefficients of the composite image are JPEG entropy encoded in JPEG entropy encoder 504. This greatly increases the speed of processing in, for this specific example, high speed printers.

The example of this single gray component can be extended to color by those familiar with color printing. Color images are traditionally printed in Cyan, Magenta, Yellow and black (CMYK) toner or ink. High speed printers can have dedicated hardware for each component to decode independent JPEG images. Lower speed printers may take Red, Green and Blue (RGB) images and do the color conversion internally to the printer. In either case, the JPEG blocks are composed of only one component.

Merge Operators in the DCT Domain

We begin by describing the operators on the DCT domain induced by the merge (and shift) operators on the picture domain. The discussion deals with one-dimensional merges (and shifts); i.e., shifts and/or merges along one axis. For illustrative purposes, the number of samples in a block, N, is chosen to be 8.

In the case of a one-dimensional shift of an image's blocks, two adjacent, non-overlapping blocks are used. The new block's real-domain samples come from the a right-most samples of the left block and the 8−σ left-most samples of the right block for a horizontal shift. We could characterize this as the RIGHT samples from the first block are being merged with the LEFT samples of the second block to create the new block. For a vertical shift, the bottom-most a samples of the top block are combined with the top-most 8−σ samples of the bottom block this is just a rotation of the horizontal case and uses the same equations. Since the adjacent blocks are from the same image, the quantization is guaranteed to be the same for both blocks.

The situation for creating a composite image from two images is more complex. For example, assuming that the blocks for the two images are already aligned, then for a one-dimensional merge, we select the blocks from the first image until reaching the block that is partially composed from both images. For blocks containing the left edge of the second image, the first σ samples from the left-most samples in the first image's block and the right-most 8−σ samples from the second image's overlapping block are used to create the merged block. Then the blocks from the second image are selected until reaching the right edge of the second image. There the merged blocks are composed from the left-most σ samples from the second image's block and the right-most 8−σ samples from the first image's block. The quantization may or may not be the same for both images.

The situation for creating a composite image by merging two images along one axis when the two images are not on the same grid is even more complex. There are 147 combinations of extracting σ contiguous samples from one block and extracting another 8−σ contiguous samples from another arbitrarily overlapping block to create a new merged block. Table 1 shows 149 different combinations including the trivial complete blocks. Table 2 shows the simplification that comes from first aligning the blocks.

TABLE 1

Combinations of Samples Extracted from Two Arbitrarily Overlapping Blocks

| Number of Samples | | First Sample Position | | Number of |
| --- | --- | --- | --- | --- |
| σ | 8−σ | block 1 | block 2 | Combinations |
| 0 | 8 | — | 0 | 1 |
| 1 | 7 | 0, 1, 2, 3, 4, 5, 6, 7 | 0, 1 | 16 |
| 2 | 6 | 0, 1, 2, 3, 4, 5, 6 | 0, 1, 2 | 21 |
| 3 | 5 | 0, 1, 2, 3, 4, 5 | 0, 1, 2, 3 | 24 |
| 4 | 4 | 0, 1, 2, 3, 4 | 0, 1, 2, 3, 4 | 25 |
| 5 | 3 | 0, 1, 2, 3 | 0, 1, 2, 3, 4, 5 | 24 |
| 6 | 2 | 0, 1, 2 | 0, 1, 2, 3, 4, 5, 6 | 21 |
| 7 | 1 | 0, 1 | 0, 1, 2, 3, 4, 5, 6, 7 | 16 |
| 8 | 0 | 0 | — | 1 |

TABLE 2

Combinations of Samples Extracted from Two Aligned Blocks

| Number of Samples | | First Sample Position | | Number of |
| --- | --- | --- | --- | --- |
| σ | 8−σ | block 1 | block 2 | Combinations |
| 0 | 8 | — | 0 | 1 |
| 1 | 7 | 0 | 1 | 1 |
| 2 | 6 | 0 | 2 | 1 |
| 3 | 5 | 0 | 3 | 1 |
| 4 | 4 | 0 | 4 | 1 |
| 5 | 3 | 0 | 5 | 1 |
| 6 | 2 | 0 | 6 | 1 |
| 7 | 1 | 0 | 7 | 1 |
| 8 | 0 | 0 | — | 1 |

If the blocks are not pre-aligned, the samples from each image might be split across two blocks. So even assuming vertical alignment, it is possible to need three (or four blocks) to create the composite block. Our invention works for all cases, but due to the excessive number of solutions required, we recommend pre-aligning the blocks using the' shift within a single image before merging to create the composite image.

Since the second image is being shifted to align it, the shift of the edge blocks can be chosen to be different than the internal shift to align with the final grid. For example, the desired left edge of the second image could always be aligned on a block boundary. Then the left samples of the first image block are merged with the left samples of the second image's block. On the other edge, the second image's right edge blocks could be right-aligned on a block boundary. Then the right-most samples from the second block are merged with the right-most samples from the first image's block.

There are four most significant cases to be distinguished, one of them also corresponding to the shift operator.

Let $D: \Re^8 \to \Re^8$ be the DCT, given by $$D_{ux} = C_u \cos\left(\frac{\pi}{16}u(2x+1)\right), \quad u, x, = 0, 1, \ldots, 7$$

where $$C_u = \begin{cases} \frac{1}{2\sqrt{2}} & \text{if } u = 0 \\ \frac{1}{2} & \text{otherwise} \end{cases}$$

This matrix is orthogonal and so the inverse of the matrix, $D^{-1}$, is equal to its transpose, $D^T$. The input domain of D is called the sampled domain, which could be a picture, for example, and the output is said to be in the DCT-domain. The points in the DCT-domain are denoted by capitals with tildes on top; e.g., $\tilde{F}$, $\tilde{G}$, $\tilde{H}$.

Figure 6:
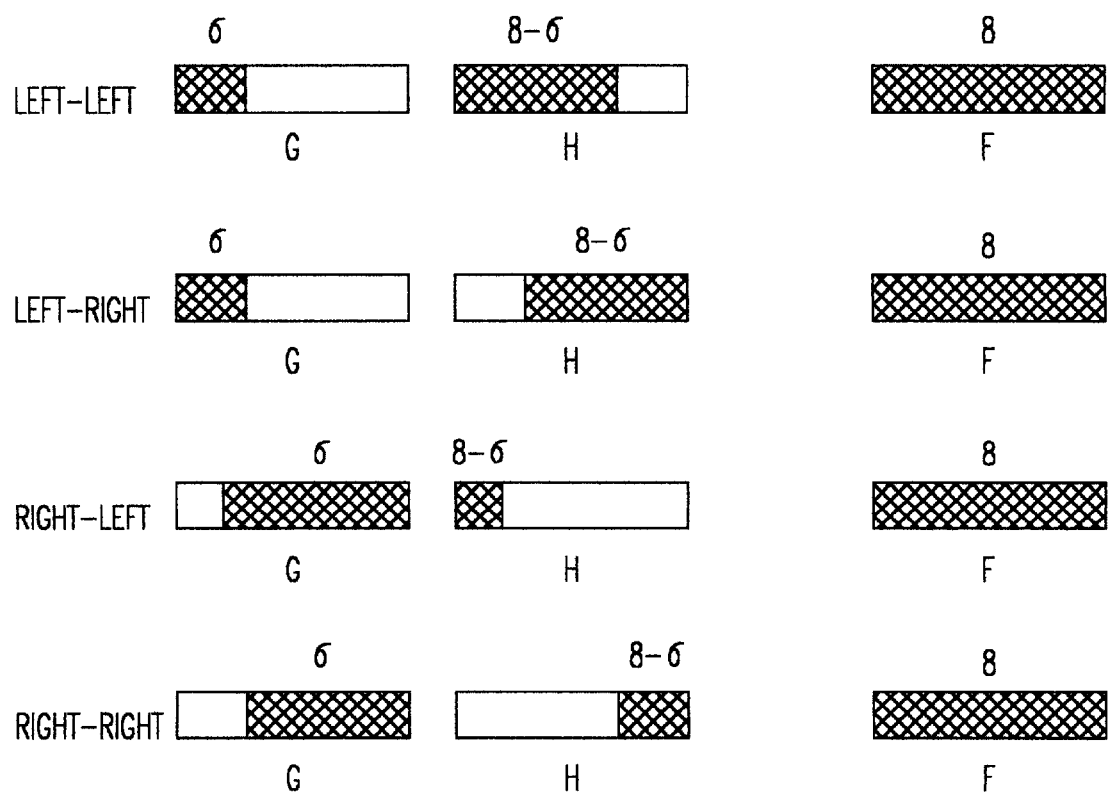
FIG. 6 is a diagram showing four types of merge operators.

There are four significant types of Merge operators, $M: \Re^8 \times \Re^8 \to \Re^8$. In each case, there is an integer, $\sigma = 0, 1, \ldots, 8$, which will indicate that a entries are taken from the left vector and $8-\sigma$ elements are taken from the second vector. In particular, the merge operators will either concatenate the left or right a elements of the left vector with the left or right $8-\sigma$ elements of the second vector. This gives rise to four distinct merge operators acting on the DCT-domains $M: \Re^8 \times \Re^8 \to \Re^8$. These are shown in FIG. 6 as left-left, left-right, right-left, and right-right.

Left-Left

Let $G, H \in \Re^8$ be vectors in the picture. We are going to introduce the notation needed to describe the merge operator $M_{ll}$ which concatenates the left $\sigma$ elements of G with the left $8-\sigma$ elements of H. The result is denoted by F. Consider the composite block vector $X \in \Re^{16}$ $$X = \begin{pmatrix} G \\ H \end{pmatrix}$$

and use the block form notation to define the 8×16 matrix $$M_{ll} = (U_\sigma, V_\sigma),$$

where $U_\sigma$ and $V_\sigma$ are 8×8 matrices defined as follows:

$$(U_\sigma)_{xy} = \begin{cases} 1 & \text{if } x = y = 0, 1, \ldots, \sigma-1 \\ 0 & \text{otherwise} \end{cases}$$

and $$(V_\sigma)_{xy} = \begin{cases} 1 & \text{if } y = 0, 1, \ldots, 7-\sigma, x = \sigma+y \\ 0 & \text{otherwise} \end{cases}$$

Now $F = M_{ll} X$. In particular, $$F = U_\sigma G + V_\sigma H.$$

Let $\tilde{G} = DG$, $\tilde{H} = DH$ and $\tilde{F} = DF$. Then $$F = DU_\sigma D^T G + DV_\sigma D^T H.$$

We introduce the 8×8 matrices $$U_\sigma = DU_\sigma D^T$$

and $$V_\sigma = D(V_{8-\sigma})^T D^T.$$

Thus, we have for u, v=0, 1, ..., 7

$$(U_\sigma)_{uv} = \sum_{m=0}^{\sigma-1} D_{um} D_{vm}$$

and $$(V_\sigma)_{uv} = \sum_{m=0}^{\sigma-1} D_{um} D_{v,8-\sigma+m}.$$

Using this notation, we get the following expression for the merge operator acting on the DCT domain:

$$M_{ll} = (U_\sigma, V_{8-\sigma}{}^T)$$

or $$\tilde{F} = U_\sigma \tilde{G} + V_{8-\sigma}{}^T \tilde{H}$$

Left-Right

Let $G, H \in \Re^8$ be again vectors in the picture. We are going to describe the merge operator $M_{lr}$ which concatenates the left a elements of G with the right $8-\sigma$ elements of H. The result is denoted by F. Let $X \in \Re^{16}$ be the composite block vector of G and H and use the block form to define the 1×16 matrix $$M_{lr} = (U_\sigma, (I-U_\sigma)),$$

where I is the identity matrix of size 8×8. Then $F = M_{lr} X$ or $$F = U_\sigma G + (I-U_\sigma) H.$$

Let $\tilde{G} = DG$, $\tilde{H} = DH$ and $\tilde{F} = DF$. Then we get the following expression for the action of the merge operator on the DCT domain, $M_{lr} = (U_\sigma, (I-U_\sigma))$ or $$F = U_\sigma G + (I-U_\sigma) H.$$

Right-Left

Let $G, H \in \Re^8$ be again vectors in the picture. We are going to describe the merge operator M, which concatenates the right a elements of G with the left $8-\sigma$ elements of H. The result is denoted by F. This is a merge operation if G and H are from two different images and a shift operation if G and H are from adjacent blocks in the same image. Let $X \in \Re^{16}$ be the composite block vector of G and H and use the block form to define the 1×16 matrix $$M_{rl} = ((V_{8-\sigma})^T, V_\sigma).$$

Then $F = M_{rl} X$ or $$F = (V_{8-\sigma})^T G + V_\sigma H.$$

Let $\tilde{G} = DG$, $\tilde{H} = DH$ and $\tilde{F} = DF$. Then we get the following expression for the action of the merge operator on the DCT domain, $M_{rl} = (V_\sigma, V_{8-\sigma}{}^T)$ or $$\tilde{F} = V_\sigma \tilde{G} + V_{8-\sigma}{}^T \tilde{H}.$$

Right-Right

Let G, H $\in \Re^8$ be again vectors in the picture. We are going to describe the merge operator $M_{rr}$ which concatenates the right $\sigma$ elements of G with the right $8-\sigma$ elements of H. The result is denoted by F. Let $X \in \Re^{16}$ be the composite block vector of G and H and use the block form to define the 1×16 matrix $$M_{rr}=((V_{8-\sigma})^T, I-U_\sigma).$$

Then $F=M_{rr}X$ or $$F=(V_{8-\sigma})^T G+(I-U_\sigma)H.$$

Let $\tilde{G}=DG$, $\tilde{H}=DH$ and $\tilde{F}=DF$. Then we get the following expression for the action of the merge operator on the DCT domain, $$M_{rr}=(V_\sigma, I-U_\sigma)$$

or $$\tilde{F}=V_\sigma\tilde{G}+(I-U_\sigma)\tilde{H}.$$

Improved Merge Operators in the DCT Domain

Instead of working directly with the input $$X = \begin{pmatrix} G \\ H \end{pmatrix}$$

we will do the actual computation of $\tilde{F}=MX$, where M is a merge operator in the DCT domain, using the block vector of sums and differences $$\begin{pmatrix} \tilde{S} \\ \tilde{D} \end{pmatrix} = \begin{pmatrix} \tilde{G}+\tilde{H} \\ \tilde{G}-\tilde{H} \end{pmatrix}.$$

This change of coordinates will have the consequence that the matrices involved will have many entries equal to zero. In particular, if the merge operator has the block form $$M=(AB),$$

then the computation of $\tilde{F}$ in terms of $\tilde{S}$ and $\tilde{D}$ results in $$\tilde{F} = \frac{1}{2}(A+B \quad A-B)\begin{pmatrix} \tilde{S} \\ \tilde{D} \end{pmatrix}.$$

The process is illustrated by four examples, two examples with the most improvement and two examples with the least improvement of the computation.

EXAMPLE 1

4-Shift or Right-Left Merge, $\sigma=4$

The shift over four elements results in the following matrix. The entries are order coded. That is, $C_1$ represents the entry of largest magnitude, and $C_{19}$ the entry with the smallest magnitude. The actual values are presented in Table 3. Observe that seventy-six entries out of one hundred twenty-eight are zero.

$$\tilde{F} = \begin{pmatrix} 1 & 0 & 0 & 0 & 0 & 0 & 0 & 0 \\ 0 & -6 & 0 & 6 & 0 & -14 & 0 & 14 \\ 0 & 0 & -1 & 0 & 0 & 0 & 0 & 0 \\ 0 & 6 & 0 & 14 & 0 & -6 & 0 & 14 \\ 0 & 0 & 0 & 0 & 1 & 0 & 0 & 0 \\ 0 & -14 & 0 & -6 & 0 & -14 & 0 & 6 \\ 0 & 0 & 0 & 0 & 0 & 0 & -1 & 0 \\ 0 & 14 & 0 & 14 & 0 & 6 & 0 & 6 \end{pmatrix}\tilde{S}+$$

$$\begin{pmatrix} 0 & -2 & 0 & 12 & 0 & -15 & 0 & 16 \\ 2 & 0 & -9 & 0 & -18 & 0 & -19 & 0 \\ 0 & 9 & 0 & 4 & 0 & -11 & 0 & 13 \\ -12 & 0 & -4 & 0 & 7 & 0 & 17 & 0 \\ 0 & 18 & 0 & -7 & 0 & -5 & 0 & 10 \\ 15 & 0 & 11 & 0 & 5 & 0 & -8 & 0 \\ 0 & 19 & 0 & -17 & 0 & 8 & 0 & 3 \\ -16 & 0 & -13 & 0 & -10 & 0 & -3 & 0 \end{pmatrix}\tilde{D}$$

TABLE 3

Constants for the 4-Shift

| i | $C_i$ | i | $C_i$ | i | $C_i$ |
|---|---|---|---|---|---|
| 1 | 0.5000000000 | 8 | 0.2451963201 | 15 | 0.10630376190 |
| 2 | 0.4530637231 | 9 | 0.2078674031 | 16 | 0.09011997765 |
| 3 | 0.4328614588 | 10 | 0.1876651387 | 17 | 0.04877258047 |
| 4 | 0.3955325418 | 11 | 0.1762214752 | 18 | 0.03732891705 |
| 5 | 0.3840888783 | 12 | 0.1590948225 | 19 | 0.01144366360 |
| 6 | 0.3266407412 | 13 | 0.1388925582 | | |
| 7 | 0.2566399836 | 14 | 0.1352990250 | | |

EXAMPLE 2

1-Shift or Right-Left Merge, $\sigma=1$

The shift over one bit results in the following matrix. The entries are order coded. That is, one represents the entry of largest magnitude and forty-five the entry with smallest magnitude. The actual values are listed in Table 4.

$$\tilde{F} = \begin{pmatrix} 1 & 0 & 0 & 0 & 0 & 0 & 0 & 0 \\ 0 & 16 & -10 & -17 & -19 & -26 & -30 & -36 \\ 0 & 10 & 9 & -20 & 0 & -40 & 0 & -44 \\ 0 & -17 & 20 & 42 & -5 & -29 & -28 & -38 \\ 0 & -19 & 0 & 5 & 0 & 13 & 0 & 39 \\ 0 & -26 & -40 & -29 & -13 & -12 & 11 & -41 \\ 0 & -30 & 0 & -28 & 0 & -11 & -9 & 24 \\ 0 & -36 & -44 & -38 & -39 & -41 & -24 & -2 \end{pmatrix}\tilde{S}+$$

$$\begin{pmatrix} 6 & -20 & -22 & -24 & -27 & -30 & -34 & -40 \\ 20 & 3 & -32 & 0 & -43 & 0 & -45 & 0 \\ -22 & 32 & 25 & -7 & -22 & -23 & -31 & -35 \\ 24 & 0 & 7 & 18 & -14 & 0 & -37 & 0 \\ 27 & 43 & 22 & 14 & 27 & -8 & 34 & -33 \\ 30 & 0 & 23 & 0 & 8 & 18 & -15 & 0 \\ 34 & 45 & 31 & 37 & 34 & 15 & 4 & -21 \\ 40 & 0 & 35 & 0 & 33 & 0 & 21 & 3 \end{pmatrix}\tilde{D}$$

TABLE 4

Constants for the 1-Shift

| i | $C_i$ | i | $C_i$ | i | $C_i$ |
|---|---|---|---|---|---|
| 1 | 0.5000000000 | 16 | 0.2214548247 | 31 | 0.08838834761 |
| 2 | 0.4714548247 | 17 | 0.2038732892 | 32 | 0.07954741119 |
| 3 | 0.4619397663 | 18 | 0.1913417163 | 33 | 0.07181633950 |
| 4 | 0.3901650430 | 19 | 0.1876651388 | 34 | 0.06764951250 |
| 5 | 0.3840888783 | 20 | 0.1733799806 | 35 | 0.05315188091 |
| 6 | 0.3750000000 | 21 | 0.1656489089 | 36 | 0.04783542906 |
| 7 | 0.3654244198 | 22 | 0.1633203706 | 37 | 0.04505998883 |
| 8 | 0.3548518533 | 23 | 0.1628074143 | 38 | 0.04055291710 |
| 9 | 0.3635533907 | 24 | 0.1469844503 | 39 | 0.03732891857 |
| 10 | 0.3060792729 | 25 | 0.1401650430 | 40 | 0.03448742240 |
| 11 | 0.2796837425 | 26 | 0.1362237767 | 41 | 0.02709659397 |
| 12 | 0.2685062872 | 27 | 0.1250000000 | 42 | 0.01850628720 |
| 13 | 0.2566399836 | 28 | 0.1246074001 | 43 | 0.01428515815 |
| 14 | 0.2371044280 | 29 | 0.1154849416 | 44 | 0.00809189203 |
| 15 | 0.2265318616 | 30 | 0.09821186975 | 45 | 0.00437930050 |

EXAMPLE 3

Left-Right Merge, σ=4

The Left-Right merge, σ=4, results in the following matrix. The entries are order coded. That is, one represents the entry of largest magnitude, and seventeen the entry with the smallest magnitude. Their values are given in Table 5. Observe that eighty-eight entries of one hundred twenty-eight are zero.

$$\tilde{F} = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix} \tilde{S} + \begin{pmatrix} 0 & 2 & 0 & -11 & 0 & 13 & 0 & -14 \\ 2 & 0 & 8 & 0 & -16 & 0 & 17 & 0 \\ 0 & 8 & 0 & 4 & 0 & -10 & 0 & 12 \\ -11 & 0 & 4 & 0 & 6 & 0 & -15 & 0 \\ 0 & -16 & 0 & 6 & 0 & 5 & 0 & -9 \\ 13 & 0 & -10 & 0 & 5 & 0 & 7 & 0 \\ 0 & 17 & 0 & -15 & 0 & 7 & 0 & 3 \\ -14 & 0 & 12 & 0 & -9 & 0 & 3 & 0 \end{pmatrix} \tilde{D}$$

TABLE 5

Constants for the Left-Right Merge with σ = 4

| i | C | i | $C_i$ | i | $C_i$ |
|---|---|---|---|---|---|
| 1 | 0.5000000000 | 7 | 0.2451963201 | 13 | 0.10630376190 |
| 2 | 0.4530637231 | 8 | 0.2078674031 | 14 | 0.09011997765 |
| 3 | 0.4328614588 | 9 | 0.1876651387 | 15 | 0.04877258047 |
| 4 | 0.3955325418 | 10 | 0.1762214752 | 16 | 0.03732891705 |
| 5 | 0.3840888783 | 11 | 0.1590948225 | 17 | 0.01144366360 |
| 6 | 0.2566399836 | 12 | 0.1388925582 | | |

EXAMPLE 4

Left-Right Merge, σ=1

The Left-Right merge with σ=1 results in the following matrix. The entries are order coded. That is, one represents the entry of largest magnitude, and thirty-one, the entry with the smallest magnitude. The actual values are given in Table 6.

$$\tilde{F} = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix} \tilde{S} + \begin{pmatrix} -5 & 13 & 14 & 15 & 18 & 20 & 24 & 29 \\ 13 & -8 & 9 & 10 & 13 & 16 & 21 & 26 \\ 14 & 9 & -7 & 11 & 14 & 17 & 22 & 27 \\ 15 & 10 & 11 & -6 & 15 & 19 & 23 & 28 \\ 18 & 13 & 14 & 15 & -5 & 20 & 24 & 29 \\ 20 & 16 & 17 & 19 & 20 & -4 & 25 & 30 \\ 24 & 21 & 22 & 23 & 24 & 25 & -3 & 31 \\ 29 & 26 & 27 & 28 & 29 & 30 & 31 & -2 \end{pmatrix} \tilde{D}$$

TABLE 6

Constants for the Left-Right Merge with σ = 1

| i | C | i | $C_i$ | i | $C_i$ |
|---|---|---|---|---|---|
| 1 | 0.5000000000 | 12 | 0.1866445851 | 23 | 0.07954741131 |
| 2 | 0.4904849416 | 13 | 0.1733799806 | 24 | 0.06764951250 |
| 3 | 0.4633883476 | 14 | 0.1633203706 | 25 | 0.05315188093 |
| 4 | 0.4228354291 | 15 | 0.1469844503 | 26 | 0.04783542906 |
| 5 | 0.3750000000 | 16 | 0.1362237767 | 27 | 0.04505998888 |
| 6 | 0.3271645709 | 17 | 0.1238199918 | 28 | 0.04055291857 |
| 7 | 0.2866116524 | 18 | 0.1250000000 | 29 | 0.03448742240 |
| 8 | 0.2595150584 | 19 | 0.1154859516 | 30 | 0.02709659397 |
| 9 | 0.2265318616 | 20 | 0.09821186975 | 31 | 0.01866445851 |
| 10 | 0.2038732892 | 21 | 0.09383256941 | | |
| 11 | 0.1920444391 | 22 | 0.08838834769 | | |

The following Lemma is useful when coding the corresponding algorithms.

Lemma 1. Let $\tilde{F}_\sigma = A_\sigma \tilde{S} + B_\sigma \tilde{D}$ be a Left-Right or Right-Left merge. Then $$|A_{8-\sigma}| = |A_\sigma|$$

and $$|B_{8-\sigma}| = |B_\sigma|.$$

Quantization

The invention further involves the incorporation of the de-quantization and re-quantization into the matrices. We consider a one-dimensional merge operator $$\tilde{F} = (A \quad B)\begin{pmatrix} \tilde{S} \\ \tilde{D} \end{pmatrix},$$

where $$\begin{pmatrix} \tilde{S} \\ \tilde{D} \end{pmatrix} = \begin{pmatrix} \tilde{G} + \tilde{H} \\ \tilde{G} - \tilde{H} \end{pmatrix}.$$

Observe, if the quantization is the same for both vectors $\tilde{G}$ and $\tilde{H}$, the de-quantization of the sum (or difference) is the sum (or difference) of the de-quantizations $$Q\tilde{G} \pm Q\tilde{H} = Q(\tilde{G} \pm \tilde{H}) = Q\tilde{S} \text{ or } Q\tilde{D}.$$

Let $q \in \Re^8$ be a quantization vector and let $Q = \text{diag}(q)$ be the corresponding diagonal matrix. Assume that $\tilde{G}, \tilde{H} \in Z^8$ is input quantized with respect to q, i.e., they are quantized on the same scale. ($Z^8$ refers to the collection of ordered 8-tuples of integers, which is what we have after quantization.) This is not a restriction if we are considering shift operators. In the case of merging of two pictures, we have to quantize them on the same scale before performing the merge for the following improvement to be successful.

Let $\hat{q} \in \mathfrak{R}^8$ be the desired quantization vector for the output and $\hat{Q}=\text{diag}(\hat{q})$ be the corresponding diagonal matrix. An elementary computation of the quantized output leads to $$\tilde{F} = \left[ \left( \hat{Q}^{-1} A Q \quad \hat{Q}^{-1} B Q \right) \begin{pmatrix} \tilde{S} \\ \tilde{D} \end{pmatrix} \right],$$

where the square bracket means the integer part, the actual quantization. Let $$\hat{A} = \hat{Q}^{-1} A Q$$

and $$\hat{B} = \hat{Q}^{-1} B Q.$$

Then by incorporating the de-quantization and quantization we get $$\tilde{F} = \left[ \left( \hat{A} \quad \hat{B} \right) \begin{pmatrix} \tilde{S} \\ \tilde{D} \end{pmatrix} \right].$$

Observe that the matrices $\hat{A}$ and $\hat{B}$ have the same zero entries as the matrices A and B, the matrices Q and $\hat{Q}$ are diagonal. In particular, $$\hat{A}_{uv} = \frac{q_v}{q_u} A_{uv}$$

$$\hat{B}_{uv} = \frac{q_v}{q_u} B_{uv},$$

the matrices $\hat{A}$ and $\hat{B}$ can be computed once per image at execution time when the input and output quantization matrices are known. The improvement from the sum and differences continue if G and H blocks have the same quantization and will appear together with the improvement just described.

Fast Paths

The third improvement is based on the fact that typical quantized input has the property that only the first one or two entries are non-zero. Assume that only the first $\tau=1, 2, \ldots, 8$ entries of the input vectors $\tilde{G}$ and $\tilde{H}$ are non-zero. Let $P_\tau : \mathfrak{R}^8 \to \mathfrak{R}^\tau$ be the projection onto the first $\tau$ entries. Observe, that $$P_\tau \tilde{G} \pm P_\tau \tilde{H} = P_\tau (\tilde{G} \pm \tilde{H}) = P_\tau \tilde{S} \text{ or } P_\tau \tilde{D}.$$

Consider the merge operator on the DCT domain $$\tilde{F} = \left[ \left( \hat{A} \quad \hat{B} \right) \begin{pmatrix} \tilde{S} \\ \tilde{D} \end{pmatrix} \right],$$

with de-quantization and quantization incorporated. Let $\tilde{S}_\tau = P_\tau \tilde{S}$ and $\tilde{D}_\tau = P_\tau \tilde{D}$ be $\tau$-vectors and $\hat{A}_\tau$ and $\hat{B}_\tau$ be the $8 \times \tau$ matrices formed by the first $\tau$ columns of respectively $\hat{A}$ and $\hat{A}$. An elementary computation shows $$\tilde{F} = \left[ \left( \hat{A}_\tau \quad \hat{B}_\tau \right) \begin{pmatrix} \tilde{S}_\tau \\ \tilde{D}_\tau \end{pmatrix} \right].$$

This improvement is referred to as fast paths. The improvement of the fast paths comes from the fact that the involved matrices are of much smaller size. In the actual implementation, this translates into fewer non-zero entries in the stored shift (or merge) matrices.

Specific Implementation

Assuming that two independent 1×8 image strips G and H lie on the same 1×8 grid, the left σ pels of strip G are merged with the right 8−σ pels of strip H by computing the DCT coefficients for the hybrid strip, yielding DCT coefficients which depend upon a mixture of samples from strips G and H. The inverse transforms for each of the respective samples are then substituted into this formula yielding a transformation from the DCT coefficients of the original strips G and H to DCT coefficients for the new hybrid strip. These equations are then optimized via algebraic and trigonometric symmetries to produce fast code.

Figure 7:
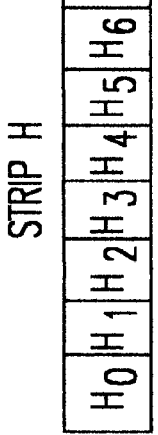
FIG. 7 is a diagram showing two strips, each having eight samples, for illustrating the one-dimensional merge algorithm according to the invention.
Figure 7:
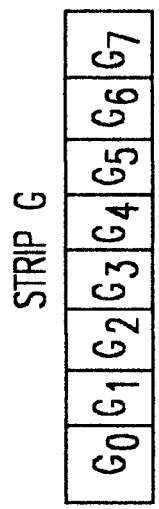

To illustrate, consider the two 1×8 data strips shown in FIG. 7. These -data strips actually occupy the same 1×8 space, but are shown separately in FIG. 7 for clarity.

Let $G_0, \ldots, \tilde{G}_7$ and $\tilde{H}_0, \ldots, \tilde{G}_7$ represent the corresponding DCT coefficients for each strip. The actual samples of each strip can then be expressed in terms of these DCT coefficients as $$G_x = \sum_{u=0}^{7} C_u \tilde{G}_u \cos\left( \frac{(2x+1)\pi u}{16} \right), \quad (3)$$

$$\text{for } x = 0, \ldots, 7,$$

$$H_x = \sum_{u=0}^{7} C_u \tilde{H}_u \cos\left( \frac{(2x+1)\pi u}{16} \right),$$

where $C_u = \frac{1}{2\sqrt{2}}$ if $u = 0$, $C_u = 1/2$ if $u > 0$.

Figure 8:
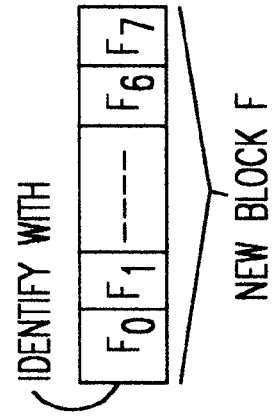
FIG. 8 is a diagram showing the process of merging the two strips to produce a hybrid strip of eight merged samples.
Figure 8:
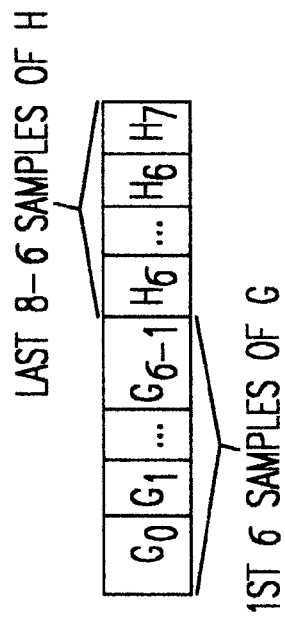

We merge the data strips G and H in the following fashion. Let σ (the merge parameter) be defined as the number of samples taken from strip G (so that 8−σ are taken from strip H). The process is generally illustrated in FIG. 8 which shows the generation of a hybrid strip. Let $F^\sigma$ denote this hybrid strip (where the superscript emphasizes the dependence on merge parameter σ). If we were to compute the forward DCT coefficients for $F^\sigma$, we would obtain $$v = 0, \ldots, 7 \quad (4)$$

$$\tilde{F}_v^\sigma = C_v \sum_{x=0}^{7} F_x^\sigma \cos\left( \frac{(2x+1)\pi v}{16} \right), \quad C_u = \begin{cases} \frac{1}{2\sqrt{2}} & v = 0 \\ \frac{1}{2} & v > 0 \end{cases}$$

where strip $F_x^\sigma$ can be either strip $G_x$ or strip $H_x$ in the following way, $$F_x^\sigma = \begin{cases} G_x & 0 \le x < \sigma \\ H_x & \sigma \le x \le 7 \end{cases} \quad (5)$$

As noted earlier, each of strips $G_x$ and $H_x$ can be expressed in terms of frequency components by application of an inverse DCT (see equation (3)). Substitution of these formulas into equation (5) yields the relation:

$$F_x^\sigma = \begin{cases} \sum_{u=0}^{7} C_u \tilde{G}_u \cos\left(\frac{(2x+1)\pi u}{16}\right) & \text{if } 0 \leq x < \sigma \\ \sum_{u=0}^{7} C_u \tilde{H}_u \cos\left(\frac{(2x+1)\pi u}{16}\right) & \text{if } 0 \leq x \leq 7 \end{cases}$$

which when substituted into equation (4) provides the formula of interest:

$$\tilde{F}_v^\sigma = C_v \sum_{x=0}^{\sigma-1} \left(\sum_{u=0}^{7} C_u \tilde{G}_u \cos\left(\frac{(2x+1)\pi u}{16}\right)\right) \cos\left(\frac{(2x+1)\pi v}{16}\right) +$$

$$C_v \sum_{x=\sigma}^{7} \left(\sum_{u=0}^{7} C_u \tilde{H}_u \cos\left(\frac{(2x+1)\pi u}{16}\right)\right) \cos\left(\frac{(2x+1)\pi v}{16}\right)$$

or, in a more elegant form $$\tilde{F}_v^\sigma = \sum_{u=0}^{7} C_u C_v \left\{ \left[\sum_{x=0}^{\sigma-1} \cos\left(\frac{(2x+1)\pi u}{16}\right)\cos\left(\frac{(2x+1)\pi v}{16}\right)\right] \tilde{G}_u + \left[\sum_{x=\sigma}^{7} \cos\left(\frac{(2x+1)\pi u}{16}\right)\cos\left(\frac{(2x+1)\pi v}{16}\right)\right] \tilde{H}_u \right\}$$

Thus, given the frequency (DCT) components $\tilde{G}_0, \ldots, \tilde{G}_7$ and $\tilde{H}_0, \ldots, \tilde{H}_7$ of the original two 1×8 strips G and H, we directly acquire DCT components for the hybrid strip F as a linear combination of the original strips G and H DCT coefficients (dependent nonlinearly on the merging parameter σ). The above derivation works identically if the strips were vertical columns 8 high and 1 wide.

Figure 9:
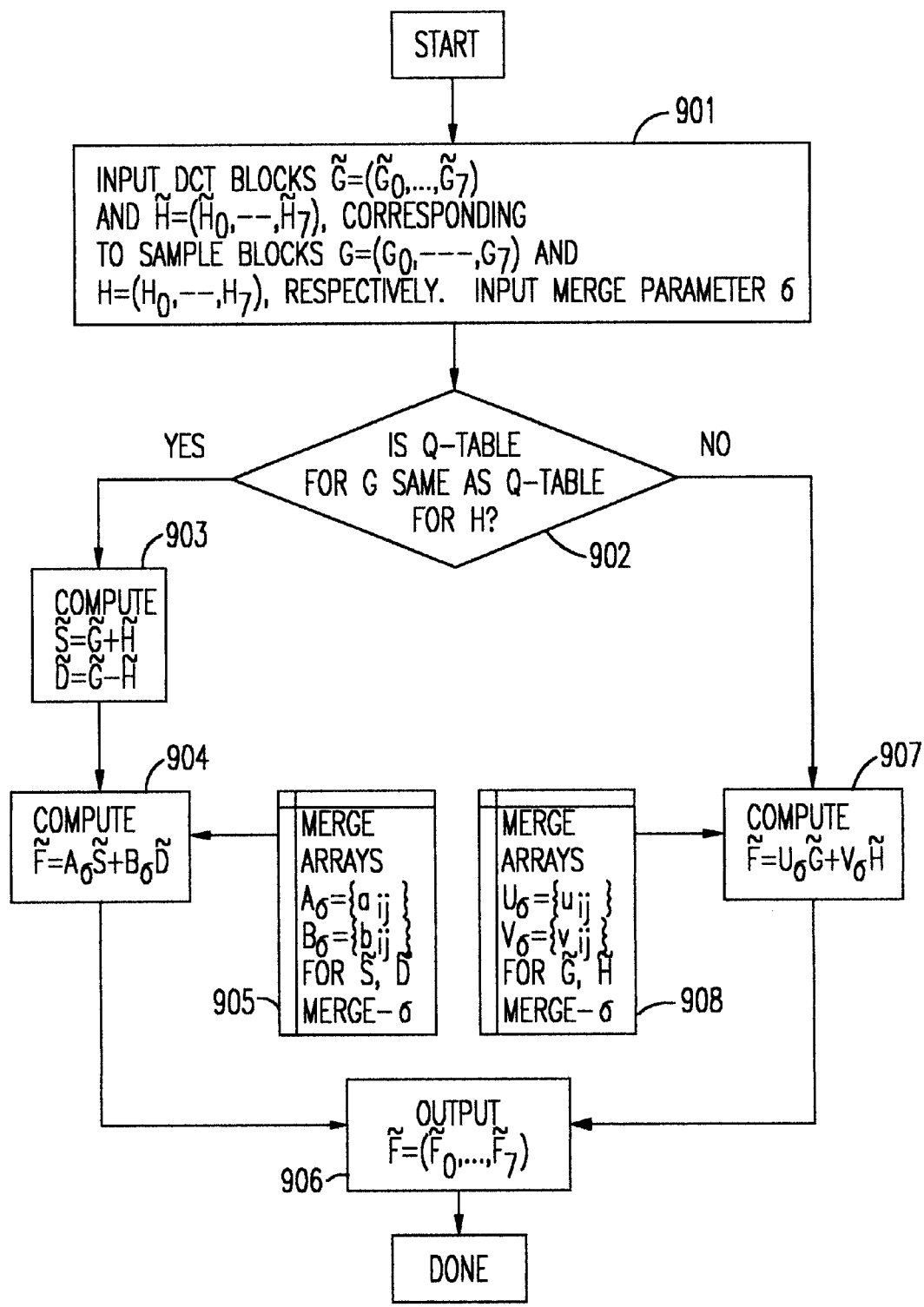
FIG. 9 is a flow diagram showing the logic of a computer implementation of a one-dimensional merge operation of two overlapping 1×8 sample blocks.

FIG. 9 is a flow diagram showing the logic of the computer implementation of the one-dimensional merge of two overlapping 1×8 sample blocks G and H. The process starts with input block 901 where DCT blocks $\tilde{G}=(\tilde{G}_0, \ldots, \tilde{G}_7)$ and $\tilde{H}=(\tilde{H}_0, \ldots, \tilde{H}_7)$, corresponding to sample blocks $G=(G_0, \ldots, G_7)$ and $H=(H_0, \ldots, H_7)$, respectively, are input and the merge parameter σ is input. A test is then made in decision block 902 to determine if the quantization table (Q-table) of G is the same as the Q-table for H. If so, the matrices $\tilde{S}=\tilde{G}+\tilde{H}$ and $\tilde{D}=\tilde{G}-\tilde{H}$ are computed in function block 903. Then, in function block 904, $\tilde{F}=A_o\tilde{S}+B_o\tilde{D}$ is computed using merge arrays 905 containing $A_o=\{a_{ij}\}$, $B_o=\{b_{ij}\}$ for $\tilde{S}$, $\tilde{D}$ and merge parameter σ. The result of this computation is the output $\tilde{F}=(\tilde{F}_0, \ldots, \tilde{F}_7)$ in output block 906.

If, on the other hand, the Q-table for G is not the same as the Q-table for H, as determined in decision block 902, then in function block 907, $\tilde{F}=U_o\tilde{G}+V_o\tilde{H}$ is computed using merge arrays 908 containing $U_o=\{u_{ij}\}$, $V_o=\{v_{ij}\}$ for $\tilde{G}$, $\tilde{H}$ and merge parameter σ. The result of this computation is the output $\tilde{F}=(\tilde{F}_0, \ldots, \tilde{F}_7)$ in output block 906.

Figure 10A:
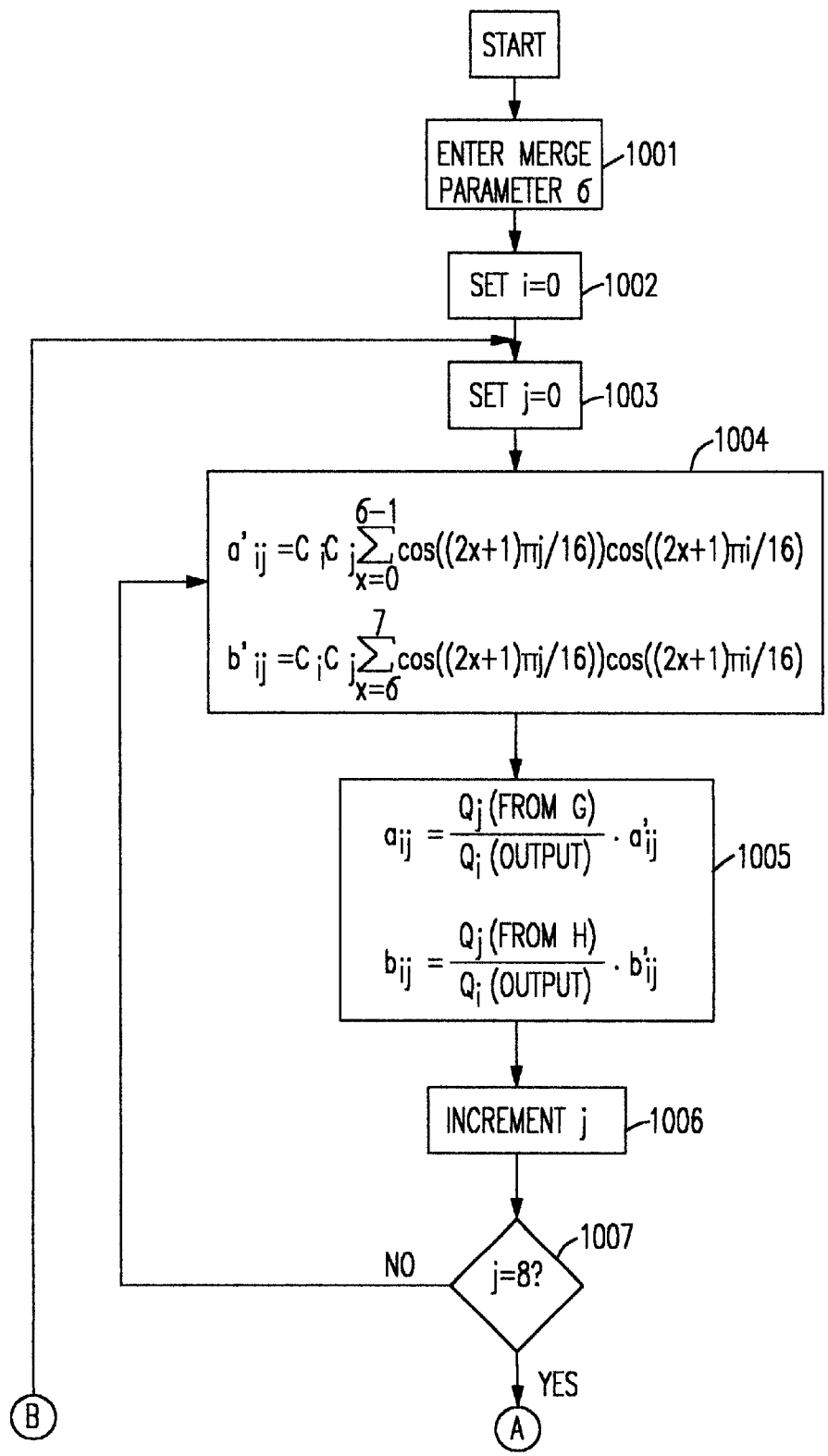
FIGS. 10A and 10B, taken together, are a flow diagram showing the logic of a computer implementation of the construction of pre-computed merge matrices.
Figure 10B:
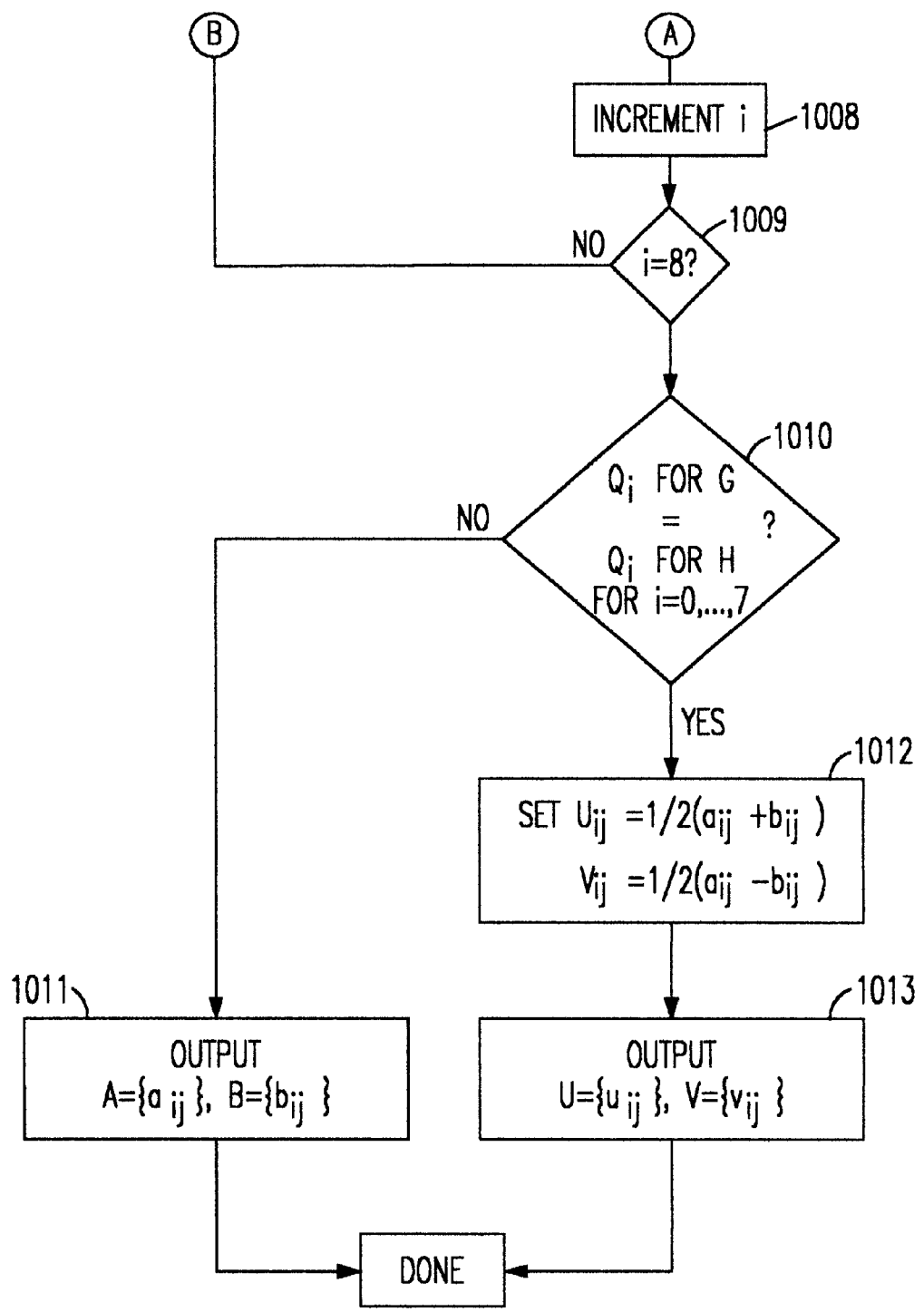

FIGS. 10A and 10B, taken together, show the flow diagram for the construction of the pre-computed merge matrices $A_o$, $B_o$, $U_o$, and $V_o$ for σ=0, …, 7 in merge arrays 905 and 908. The process starts by entering the merge parameter a in function block 1001. The process is initialized in function blocks 1002 and 1003 by setting i=0 and j=0, respectively, before entering the processing loop. Upon entering the processing loop, the following equations are computed in function block 1004:

$$a'_{ij} = C_i C_j \sum_{x=0}^{\sigma-1} \cos\left(\frac{(2x+1)\pi j}{16}\right) \cos\left(\frac{(2x+1)\pi i}{16}\right)$$

$$b'_{ij} = C_i C_j \sum_{x=\sigma}^{7} \cos\left(\frac{(2x+1)\pi j}{16}\right) \cos\left(\frac{(2x+1)\pi i}{16}\right)$$

This is followed by computing the following equations in function block 1005:

$$a_{ij} = \frac{Q_j \text{ (from } G\text{)}}{Q_i \text{ (output)}} \cdot a'_{ij}$$

$$b_{ij} = \frac{Q_j \text{ (from } H\text{)}}{Q_i \text{ (output)}} \cdot b'_{ij}$$

The index j is incremented in function block 1006, and then a test is made in decision block 1007 to determine if j equals 8. If not, the process loops back to function block 1004; otherwise, the index i is incremented in function block 1008, and then a test is made in decision block 1009 to determine if i equals 8. If not, the process again loops back to function block 1003. In this way, the elements of the merge arrays are generated. When the index i is equal to 8, a test is made in decision block 1010 to determine if the quantization coefficients $Q_i$ for G are equal to the quantization coefficients $Q_i$ for H for i=0, …, 7. If not, the merge arrays A=$\{a_{ij}\}$ and B=$\{b_{ij}\}$ are output in output block 1011; otherwise, $u_{ij}$ is set to ½($a_{ij}+b_{ij}$) and $v_{ij}$ is set to ½($a_{ij}-b_{ij}$) in function bock 1012 before outputting the merge arrays U=$\{u_{ij}\}$ and V=$\{v_{ij}\}$ in output block 1013.

The foregoing process may be practiced with modifications to function block 1005. FIG. 11 shows function block 1005' which calculates $a_{ij}$ and $b_{ij}$ incorporating only the de-quantization according to the invention. If the merged or shifted output will be going to an IDCT block, then re-quantization in the constants is not desired. FIG. 12 shows the function block 1005 which calculates $a_{ij}$ and $b_{ij}$ incorporating only re-quantization according to the invention. If the input came directly from an FDCT, the de-quantization is not needed. FIG. 13 shows the function block 1005''' in which $a_{ij}$ and $b_{ij}$ are set equal to $a_{ij}'$ and $b_{ij}'$ because neither de-quantization nor re-quantization is desired in the constants.

Figure 14:
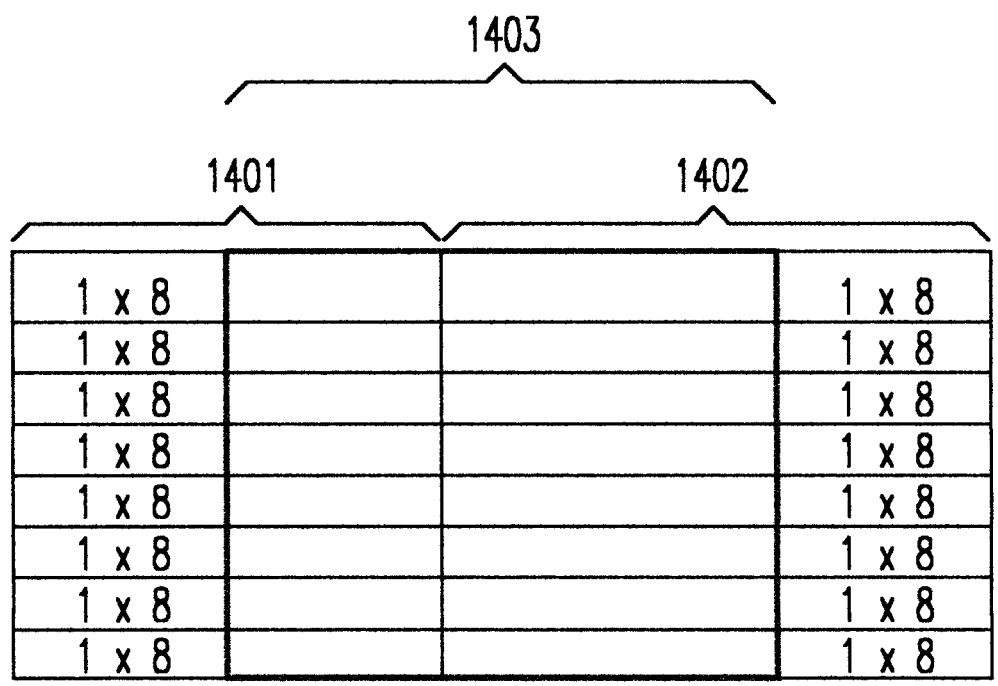
FIG. 14 illustrates how an 8×8 DCT block can be computed from two adjacent two-dimensional 8×8 DCT blocks as eight one-dimensional transform calculations.

In addition, while the invention has been described primarily as a horizontal shift (or merge) of two blocks, those skilled in the art will understand that the shift (or merge) can be made in the vertical direction. Moreover, the one-dimensional shift (or merge) according to the present invention can be extended to the two-dimensional case. FIG. 14 illustrates how an 8×8 block can be computed from two adjacent two-dimensional 8×8 DCT blocks 1401 and 1402 as eight one-dimensional transform calculations. This can be viewed as an extension of FIG. 6 for the 1×8 one-dimensional case. In FIG. 14, the new block 1403, shown in bold line outline overlapping blocks 1401 and 1402, is composed in this example of (σ=3 samples of the right-most rows of the block 1401 and the 8−σ=5 samples of the left-most of the block 1402. The one-dimensional equations apply with different quantization values for each row. Therefore, eight sets of shift (or merge) matrices must be calculated.

Summarizing, for a shifting the block left a pixels in a sample domain consisting of two adjacent 1×8 blocks G (left block) and H (right block), the DCT coefficients of the sample block composed of the rightmost σ pixels of G are computed followed by the 8−σ leftmost pixels of H, yielding DCT coefficients containing a mixture of sample data from G and H. The inverse transforms for each of the respective samples from G and H are then substituted into the formula to obtain a transformation from the DCT coefficients of each original block into the DCT coefficients for the new, "shifted" or hybrid block. These equations are then optimized by appealing to symmetries and trigonometric identities to yield an even faster transformation.

Although we have focused our attention on the Discrete Cosine Transform (DCT) since we are interested in processing JPEG (Joint Photographic Experts Group) images, the disclosed algorithm can be easily extended to any other situation where orthogonal linear transformations are applied to a real sample space such as the Hadamard-Walsh Transform used in digital image and speech processing.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A computer implemented method for transform domain processing of transformed data comprising the steps of:
   receiving first and second input blocks of transform coefficients of two blocks G and H;
   substituting inverse transforms for each of the respective coefficients from the blocks G and H to obtain a transformation from the transform coefficients of each original block into transform coefficients for a new hybrid block F; and
   merging the first and second input blocks of data, by combining transform coefficients of the blocks G and H composed of contiguous σ samples of block G followed by contiguous N−σ samples of block H, the sample blocks consisting of two 1×N blocks G and H where σ is a merge parameter and N>σ, yielding coefficients containing a mixture of sample data from blocks G and H to yield a hybrid block F in the transform domain.

2. The computer implemented method for transform domain processing of transformed data recited in claim 1, wherein the first and second data are image data and the samples are from one component of the image data.

3. The computer implemented method for transform domain processing of transformed data recited in claim 2, wherein the step of transforming uses the Discrete Cosine Transform (DCT).

4. The computer implemented method for transform domain processing of transformed data recited in claim 3, wherein N=8.

5. The computer implemented method for transform domain processing of transformed data recited in claim 3, wherein the transformed images are JPEG (Joint Photographic Experts Group) compressed images.

6. The computer implemented method for transform domain processing of transformed data recited in claim 3, wherein the transformed images are MPEG (Moving Pictures Experts Group) compressed images.

7. The computer implemented method for transform domain processing of transformed data recited in claim 1, wherein the first and second data are audio data and the samples are audio samples.

8. The computer implemented method for transform domain processing of transformed data recited in claim 7, wherein the step of transforming uses the Discrete Cosine Transform (DCT).

9. The computer implemented method for transform domain processing of transformed data recited in claim 1, further comprising the step of optimizing the equations using symmetries and trigonometric identities to yield a fast transformation.

10. The computer implemented method for transform domain processing of transformed data recited in claim 1, wherein the hybrid block F is constructed using precomputed merge arrays for the merge parameter σ.

11. The computer implemented method for transform domain processing of transformed data recited in claim 10, wherein the blocks G and H are overlapping and the step of merging is performed by computing a sum and a difference of coefficients of the transformed data for the blocks G and H and the hybrid block F is constructed by accessing the pre-computed merge arrays to generate coefficients for the hybrid block F as a function of the computer sum and difference of coefficients of the transform coded data for the blocks G and H.

12. A computer system for transform domain processing of transformed data comprising:
   temporary storage means for storing first and second input blocks of transform coefficients for two blocks G and H; and
   shifter and merger means accessing the temporary storage means for the respective coefficients from the blocks G and H and combining transform coefficients of the blocks G and H composed of contiguous σ samples of block G followed by contiguous N−σ samples of block H, the sample blocks consisting of two 1×N blocks G and H where σ is a merge parameter and N>σ, yielding coefficients containing a mixture of sample data from blocks G and H to yield a hybrid block F in the transform domain.

13. The computer system recited in claim 12, wherein the computer system is a printing system using Joint Photographic Experts Group (JPEG) compressed images and wherein the temporary storage means and the shifter and merger means comprise a printer server.

14. The computer system recited in claim 13, wherein the printer server further comprises:
   a JPEG entropy decoder receiving JPEG compressed data and storing transform coefficients on said temporary storage means; and
   a JPEG entropy encoder accessing coefficients of the hybrid block F in the transform domain from said temporary storage means and outputting shifted and/or merged JPEG compressed composite data.

15. The computer system recited in claim 14, further comprising:
   a source of image data;
   a JPEG encoder receiving image data and generating JPEG compressed image data, the JPEG compressed data being transmitted to said printer server;
   a JPEG decoder connected to receive an output from said printer server and reconstructing composite image data; and
   a printer receiving the composite image data and printing a composite image.

16. The computer system recited in claim 15, wherein said source of image data is a scanner.

17. A computer implemented method for transform domain processing of transformed data comprising the steps of:
   receiving first and second input blocks of transform coefficients of two blocks G and H;

generating a transformation from the transform coefficients of each original block G and H into transform coefficients for a new hybrid block F;

generating constants from output quantization values for each transform coefficient for the hybrid block F; and merging the first and second input blocks of data, by combining transform coefficients of the blocks G and H composed of contiguous σ samples of block G followed by contiguous N−σ samples of block H, the sample blocks consisting of two 1×N blocks G and H where σ is a merge parameter and N>σ, yielding coefficients containing a mixture of sample data from blocks G and H to yield quantized coefficients for said hybrid block F in the transform domain.

18. A computer implemented method for transform domain processing of transformed data comprising the steps of:

entropy decoding first and second input blocks of data to generate two blocks G and H of quantized transform coefficients;

generating a transformation from the transform coefficients of each original block G and H into transform coefficients for a new hybrid block F;

generating constants from input quantization values for each transform coefficient for said input blocks G and H; and merging the first and second input blocks of data, by combining quantized transform coefficients of the blocks G and H composed of contiguous a samples of block G followed by contiguous N−σ samples of block H, the sample blocks consisting of two 1×N blocks G and H where σ is a merge parameter and N>σ, yielding coefficients containing a mixture of sample data from blocks G and H to yield said hybrid block F in the transform domain.

19. A computer implemented method for transform domain processing of transformed data comprising the steps of:

entropy decoding first and second input blocks of data to generate two blocks G and H of quantized transform coefficients;

generating a transformation from the transform coefficients of each original block G and H into transform coefficients for a new hybrid block F;

generating constants from input quantization values for each transform coefficient for said input blocks G and H and from the quantization values for each transform coefficient for said hybrid block F; and merging the first and second input blocks of data, by combining quantized transform coefficients of the blocks G and H composed of contiguous σ samples of block G followed by contiguous N−σ samples of block H, the sample blocks consisting of two 1×N blocks G and H where σ is a merge parameter and N>σ, yielding coefficients containing a mixture of sample data from blocks G and H to yield quantized transform coefficients for said hybrid block F in the transform domain.

20. A computer system which performs transform domain processing of transformed data comprising:

transform means for forward transforming first and second input blocks of data to generate two blocks G and H of transform coefficients;

a processor generating a transformation from the transform coefficients of each original block G and H into transform coefficients for a new hybrid block F, said processor also generating constants from output quantization values for each transform coefficient for the hybrid block F; and means for merging the first and second input blocks of data, by combining transform coefficients of the blocks G and H composed of contiguous σ samples of block G followed by contiguous N−σ samples of block H, the sample blocks consisting of two 1×N blocks G and H where σ is a merge parameter and N>σ, yielding coefficients containing a mixture of sample data from blocks G and H to yield quantized coefficients for said hybrid block F in the transform domain.

21. A computer system for performing transform domain processing of transformed data comprising:

a decoder entropy decoding first and second input blocks of data to generate two blocks G and H of quantized transform coefficients;

a processor generating a transformation from the transform coefficients of each original block G and H into transform coefficients for a new hybrid block F, said processor also generating constants from input quantization values for each transform coefficient for said input blocks G and H; and means for merging the first and second input blocks of data, by combining quantized transform coefficients of the blocks G and H composed of contiguous σ samples of block G followed by contiguous N−σ samples of block H, the sample blocks consisting of two 1×N blocks G and H where σ is a merge parameter and N>σ, yielding coefficients containing a mixture of sample data from blocks G and H to yield said hybrid block F in the transform domain.

22. A computer system for performing transform domain processing of transformed data comprising:

a decoder entropy decoding first and second input blocks of data to generate two blocks G and H of quantized transform coefficients; and a processor merging the first and second input blocks of data, by combining quantized transform coefficients of the blocks G and H composed of contiguous a samples of block G followed by contiguous N−σ samples of block H, the sample blocks consisting of two 1×N blocks G and H where σ is a merge parameter and N>σ, yielding coefficients containing a mixture of sample data from blocks G and H to yield quantized transform coefficients for a hybrid block F in the transform domain.

23. A computer implemented method for transform domain processing of transformed data comprising the steps of:

receiving a first block G and a second block H of transform coefficients of size 1×N; and generating a third block F of transform coefficients by substituting transform coefficients from each of said first and second blocks G and H into equations derived by:

(1) inverse transforming equations for the transform coefficients for the blocks G and H, (2) merging the resulting equations for the real domain blocks into a vector representation for a third real domain block F composed of continuous a real domain samples of block G followed by N−σ, yielding real domain coefficient equations for the block F, and (3) forward transforming the block F to yield equations for transform coefficients of the new merged block F in the transform domain.

* * * * *